(12) United States Patent
Hauck et al.

(10) Patent No.: US 6,773,739 B2
(45) Date of Patent: Aug. 10, 2004

(54) METHOD AND APPARATUS FOR EXTRUSION OF FOOD PRODUCTS INCLUDING BACK PRESSURE VALVE/ DIVERTER

(75) Inventors: Bobbie W. Hauck, Sabetha, KS (US); Marc Wenger, Sabetha, KS (US)

(73) Assignee: Wenger Manufacturing, Inc, Sabetha, KS (US)

( * ) Notice: Subject to any disclaimer, the term of this patent is extended or adjusted under 35 U.S.C. 154(b) by 108 days.

(21) Appl. No.: 10/232,110

(22) Filed: Aug. 30, 2002

(65) Prior Publication Data

US 2004/0043094 A1 Mar. 4, 2004

(51) Int. Cl.[7] .............................. A23K 1/00; A23P 1/12; B29C 44/02
(52) U.S. Cl. ........................... 426/516; 99/357; 99/483; 99/516; 264/40.3; 264/46.1; 264/141; 425/207; 425/311; 425/377; 426/448; 426/511
(58) Field of Search ................................. 426/516, 511, 426/448, 805; 99/357, 483, 516; 425/207, 311, 376.1, 377; 264/40.3, 46.1, 141

(56) References Cited

U.S. PATENT DOCUMENTS

| 970,240 A | 9/1910 | Kilborn |
|---|---|---|
| 2,401,642 A | 6/1946 | Hiltner et al. |
| 2,436,201 A | 2/1948 | Cole |
| 2,466,934 A | 4/1949 | Dellenbarger |
| 2,505,125 A | 8/1950 | List |
| 2,591,508 A | 4/1952 | Brown |
| 3,026,272 A | 3/1962 | Rubens et al. |
| 3,117,006 A | 1/1964 | Wenger |
| 3,164,375 A | 1/1965 | Frenkel |
| 3,230,582 A | 1/1966 | Hoffman et al. |
| 3,272,110 A | 9/1966 | Tsuchiya |
| 3,317,957 A | 5/1967 | Heston et al. |

(List continued on next page.)

FOREIGN PATENT DOCUMENTS

| DE | 3602464 | 7/1987 |
|---|---|---|
| EP | 1087675 | 11/2003 |
| GB | 1144466 | 3/1969 |
| WO | 9317592 | 9/1993 |
| WO | 9962361 | 12/1999 |
| WO | 0172153 | 10/2001 |

OTHER PUBLICATIONS

Anle; China Aquaculture Scientific Research Academy—The Research Institute of Fishery Machinery and Instruments; Bulking Technology for Sinking Pellet Prawn Feed Processing (Sep. 16, 1987) with translation.

*Primary Examiner*—George C. Yeung
(74) *Attorney, Agent, or Firm*—Hovey Williams LLP

(57) ABSTRACT

An extruder system (10, 124) for the processing of feed materials is provided including an extruder (12), adjustable back pressure valve assembly (14) and a superatmospheric post-extrusion product treatment assembly (16, 124). The back pressure valve assembly (14) includes an adjustable valve member (48) which can be shifted to alter the effective cross-sectional open area of a product passageway (36), and alternately can be shifted to a product diverting position wherein the product is diverted from downstream processing. The treatment assembly (16) includes a sealed housing (78) directly coupled to the assembly (14) so that product emerging from the assembly (14) passes into housing (78) without experiencing atmospheric pressure. The treatment assembly (124) includes a product-guiding cowling (128) which is open to the atmosphere, together with a sealed housing (134) for effecting above atmospheric pressure treatment of extruded product.

25 Claims, 3 Drawing Sheets

U.S. PATENT DOCUMENTS

| | | |
|---|---|---|
| 3,518,721 A | 7/1970 | Rukas et al. |
| 3,522,627 A | 8/1970 | Vanzo |
| 3,589,163 A | 6/1971 | Byrne |
| 3,605,188 A | 9/1971 | McCormick et al. |
| 3,675,934 A | 7/1972 | Heston |
| 3,734,472 A | 5/1973 | Strohmeier |
| 3,778,522 A | 12/1973 | Strommer |
| 3,782,700 A | 1/1974 | Wittrock |
| 3,826,598 A | 7/1974 | Kaufmann |
| 3,832,431 A | 8/1974 | Matthaei |
| 3,852,389 A | 12/1974 | Adler et al. |
| 3,904,775 A | 9/1975 | Harwood et al. |
| 3,908,025 A | 9/1975 | Miller et al. |
| 3,925,566 A | 12/1975 | Reinhart et al. |
| 3,940,495 A | 2/1976 | Flier |
| 3,958,032 A | 5/1976 | Merriam |
| 3,965,268 A | 6/1976 | Stocker et al. |
| 3,978,236 A | 8/1976 | Sair et al. |
| 3,986,816 A | 10/1976 | Gwinn et al. |
| 4,020,187 A | 4/1977 | McCulloch et al. |
| 4,031,267 A | 6/1977 | Berry et al. |
| 4,039,168 A | 8/1977 | Caris et al. |
| 4,039,691 A | 8/1977 | Hildebolt |
| 4,047,705 A | 9/1977 | Hanslik |
| 4,059,206 A | 11/1977 | Ellwood |
| 4,118,164 A | 10/1978 | Wenger et al. |
| 4,128,051 A | 12/1978 | Hildebolt |
| 4,139,648 A | 2/1979 | Small et al. |
| 4,143,169 A | 3/1979 | Skoch et al. |
| 4,175,486 A | 11/1979 | Hildebolt et al. |
| 4,184,772 A | 1/1980 | Meyer |
| 4,245,552 A | 1/1981 | Small et al. |
| 4,321,026 A | 3/1982 | Lambertus |
| 4,323,528 A | 4/1982 | Collins |
| 4,408,888 A | 10/1983 | Hanslik |
| 4,416,605 A | 11/1983 | Konno et al. |
| 4,418,086 A | 11/1983 | Marino et al. |
| 4,419,309 A | 12/1983 | Krutchen |
| 4,438,146 A | 3/1984 | Colby et al. |
| 4,454,804 A | 6/1984 | McCulloch |
| 4,465,451 A | 8/1984 | Adderley, Jr. |
| 4,468,872 A | 9/1984 | Korte |
| 4,486,369 A | 12/1984 | Schafler et al. |
| 4,524,081 A | 6/1985 | Bansal |
| 4,525,073 A | 6/1985 | Spinner |
| 4,528,155 A | 7/1985 | Elder |
| 4,533,310 A | 8/1985 | Spinner |
| 4,606,873 A | 8/1986 | Biglione et al. |
| 4,725,215 A | 2/1988 | Kreyenborg et al. |
| 4,764,020 A | 8/1988 | Moriyama |
| 4,773,763 A | 9/1988 | Weber |
| 4,875,847 A | 10/1989 | Wenger et al. |
| 4,882,105 A | 11/1989 | Volk, Jr. |
| 4,894,191 A | 1/1990 | Tatzel et al. |
| 4,954,352 A * | 9/1990 | Luker .................. 264/141 |
| 4,984,977 A | 1/1991 | Grimminger et al. |
| 5,102,671 A | 4/1992 | Coles |
| 5,120,559 A | 6/1992 | Rizvi et al. |
| 5,120,565 A | 6/1992 | Lanter et al. |
| 5,149,555 A | 9/1992 | Flindall |
| 5,186,970 A | 2/1993 | Ogiwara et al. |
| 5,190,768 A | 3/1993 | Ishida et al. |
| 5,232,280 A | 8/1993 | Moriyama |
| 5,413,746 A | 5/1995 | Birjukov |
| 5,415,473 A | 5/1995 | Nakano et al. |
| 5,417,992 A | 5/1995 | Risvi et al. |
| 5,487,862 A | 1/1996 | Foresman |
| 5,527,553 A | 6/1996 | Kazemzadeh |
| 5,609,892 A | 3/1997 | Garcia et al. |
| 5,628,560 A | 5/1997 | Eigruber |
| 5,652,009 A | 7/1997 | Mair |
| 5,694,833 A | 12/1997 | Wenger |
| 5,700,510 A | 12/1997 | Hauck |
| 5,700,512 A | 12/1997 | Desjardins et al. |
| 5,704,555 A | 1/1998 | Arastoopour |
| 5,725,902 A | 3/1998 | Lesueur-Bryner et al. |
| 5,744,186 A | 4/1998 | Harrison |
| 5,803,597 A | 9/1998 | Giani |
| 5,807,517 A | 9/1998 | Wissmann et al. |
| 5,820,911 A | 10/1998 | Morse et al. |
| 5,836,681 A | 11/1998 | Giani |
| 5,840,345 A | 11/1998 | Ayash |
| 5,843,489 A | 12/1998 | Nakano |
| 5,895,617 A | 4/1999 | Mizuguchi et al. |
| 5,932,264 A | 8/1999 | Hurd et al. |
| 5,939,124 A | 8/1999 | Wenger |
| 6,045,851 A | 4/2000 | Cross |
| 6,093,350 A | 7/2000 | Sadinski |
| 6,129,450 A | 10/2000 | Braun |
| 6,217,922 B1 | 4/2001 | Munz |
| RE37,235 E | 6/2001 | Hauck et al. |
| 6,251,318 B1 | 6/2001 | Arentsen et al. |
| 6,331,069 B1 | 12/2001 | Putti |
| 6,340,487 B1 | 1/2002 | Wenger et al. |
| 6,386,748 B1 | 5/2002 | Huber et al. |
| 6,465,029 B2 | 10/2002 | Wenger et al. |
| 6,531,077 B1 | 3/2003 | Flarup-Knudsen |

* cited by examiner

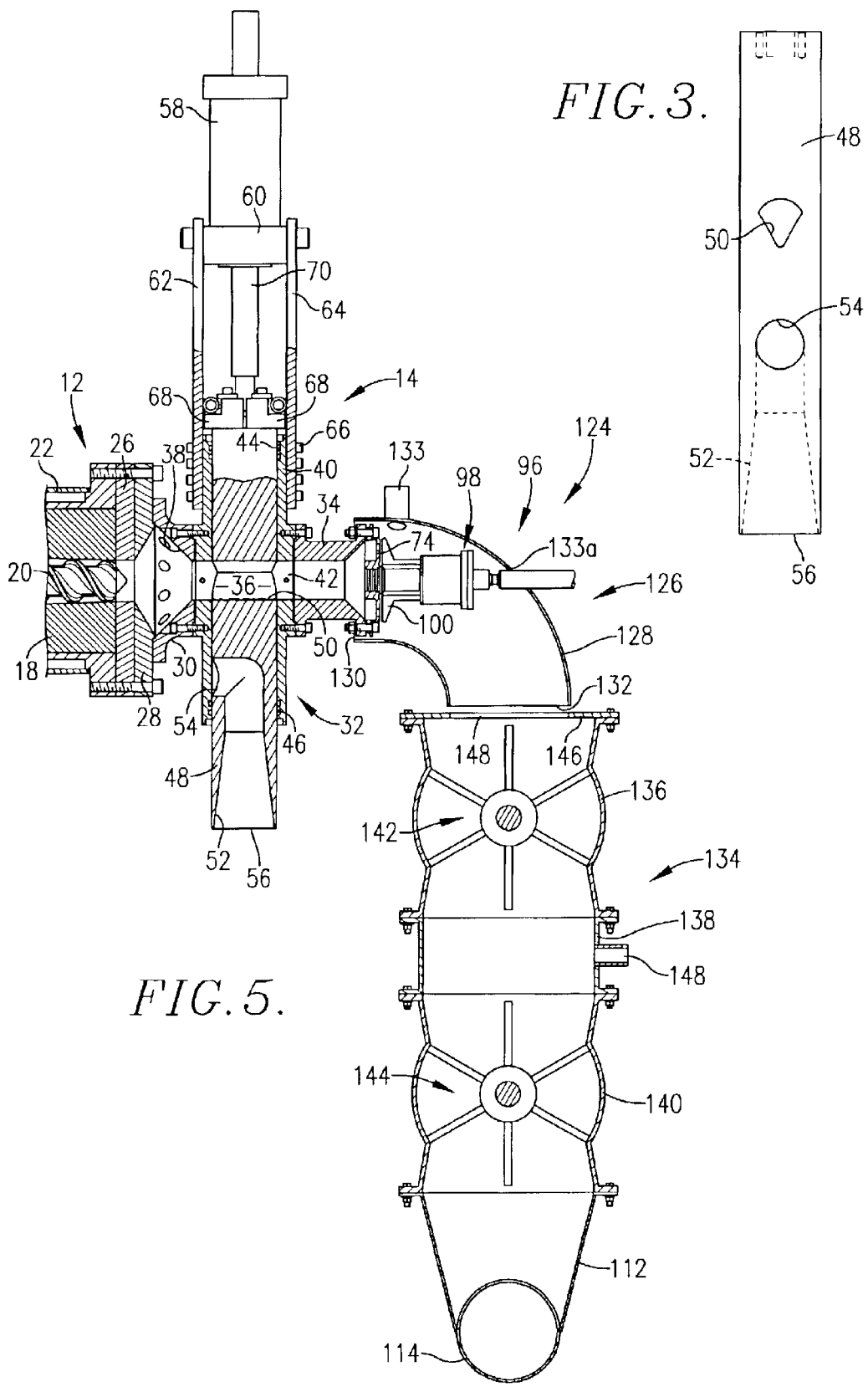

METHOD AND APPARATUS FOR EXTRUSION OF FOOD PRODUCTS INCLUDING BACK PRESSURE VALVE/DIVERTER

BACKGROUND OF THE INVENTION

1. Field of the Invention

The present invention is broadly concerned with improved extrusion systems which include an extruder barrel and screw assembly, together with a product treatment assembly designed for post-extrusion, superatmospheric pressure treatment of extrudates. More particularly, the invention is concerned with such systems and corresponding methods where, in preferred forms, a selectively adjustable back pressure valve assembly is provided upstream of an extrusion die, with a post-extrusion sealed housing for extrudate treatment. The housing may be directly coupled to the extruder assembly so that extrudate passes from the die into the housing; alternately, an atmospheric pressure, product-directing cowling may be employed with a downstream sealed housing.

2. Description of the Prior Art

Extrusion cooking systems have long been used for the preparation of human foods and animal feed products. Broadly speaking, such extrusion systems include an elongated extruder barrel with one or more elongated, axially rotatable, helically flighted extruder screws within the barrel, together with a downstream restricted orifice extrusion die. In typical processing, the feed ingredients are fed into and through the extruder barrel where they are subjected to increasing levels of heat, pressure and shear in order to at least partially cook the ingredients and form an extrudate. This extrudate may be cut or otherwise subdivided at on downstream of the die. Thereafter, the subdivided extrudate is often subjected to post-extrusion treatments such as surface application of fats and drying.

Another post-extrusion treatment which has long been practiced involves passing the extrudate into and through a superatmospheric pressure treatment chamber, which often involves injection of high pressure steam into the chamber so as to establish and maintain the desired superatmospheric pressure conditions therein. Such post-extrusion pressure treatment has been found to effectively condition the extruded products and improve the quality thereof. Thus, U.S. Pat. No. 4,039,691 describes a process wherein food-grade materials are extruded and then directly passed into an elongated superatmospheric pressure chamber while steam is injected into the chamber. In order to maintain superatmospheric pressures within the post-extrusion chamber (e.g., 60–80 psi), the '691 patent describes the use of spring-loaded or rotary valves, or a rotary letdown pump; more generally, the patent describes the use of any device which allows product to exit the confined post-extrusion chamber while maintaining a predetermined back pressure therein.

Similarly, U.S. Pat. No. 4,139,648 employs an upstream extruder with a sealed chamber post-extrusion treatment device, much in the manner of the '691 patent. Here again, the treatment chamber is designed so as to maintain superatmospheric pressure conditions therein, normally established via steam injection.

U.S. Pat. No. 3,778,522 is yet another variation of this concept, and employs an extruder equipped with a conventional apertured die and a rotary knife; extrusion pressures at the die are about 500 psig or more, and the knife serves to subdivide the extrudate into small pellets or the like. The post-extrusion treatment involves use of an upright tube having a restricted outlet and a steam inlet; in this fashion, the cut extrudate is treated within the tube at high pressures up to 140 psig.

PCT Publications Nos. WO 99/62361 and WO 01/72153 are still further examples of the equipment and techniques disclosed in the aforementioned U.S. patents. Hence, these publications disclose an extruder device which feeds product directly into a superatmospheric pressure treatment chamber. In order to maintain pressure conditions, one or more rotary valves are employed, together with steam injection. The WO 01/72153 publication describes a very complex arrangement wherein the post-extrusion treatment chamber is shiftably supported so that it can be moved to a nonoperative position during startup of the extruder or in the event of a process upset. This is deemed to be a very unwieldy device, which is difficult to operate and entails significant operator time and effort.

SUMMARY OF THE INVENTION

The present invention provides improved extrusion systems and corresponding methods for the production of a wide variety of extrudates, especially human foods and animal feeds. Broadly speaking, the extruder systems of the invention include an elongated tubular extruder barrel equipped with at least one elongated, axially rotatable, flighted screw within the barrel. A selectively adjustable back pressure valve assembly is operatively coupled to the extruder outlet and comprises structure defining an elongated passageway with an inlet and an outlet, the inlet communicating with the extruder barrel outlet, and the outlet having a restricted orifice die. In addition, the valve assembly has an apertured valve member selectively shiftable relative to the passageway for altering the effective cross-sectional open area presented by the passageway. In this manner, operating conditions within the extruder can be effectively altered or maintained to insure optimum product output. The overall extruder systems further include a post-extrusion product treatment assembly for receiving product after passage through the extruder and back pressure valve assembly. Such a treatment assembly permits superatmospheric pressure treatment of the extruded product, so as to facilitate density control of the product.

In one form of the invention, the treatment assembly comprises a sealed housing equipped with a rotary outlet valve and which is directly coupled to the valve assembly so that product emerging from the latter passes immediately into the chamber without passage through the atmosphere. In another embodiment, the treatment assembly includes an open, atmospheric pressure product-guiding cowling coupled to the valve assembly outlet, together with a downstream sealed, pressurizable treatment housing. In this embodiment, the extruded product passes through the atmosphere and then into the sealed treatment housing.

BRIEF DESCRIPTION OF THE DRAWINGS

FIG. 3 is a front view of the vertically shiftable die member forming a part of the preferred back pressure valve assembly, with the production diversion passageway being illustrated in phantom;

FIG. 5 is a fragmentary view in partial vertical section of another extrusion system in accordance with the invention, including a back pressure valve assembly and a superatmospheric pressure treatment assembly, the latter having a product-guiding cowling open to the atmosphere and a downstream superatmospheric pressure treatment housing.

DETAILED DESCRIPTION OF THE PREFERRED EMBODIMENT

Turning now to the drawings, FIGS. 1–4 illustrate an embodiment of the invention in the form of an extruder system 10 broadly comprising an extruder 12, back pressure valve assembly 14 and post-extrusion treatment assembly 16. The system 10 is designed for processing of a wide variety of products, particularly animal or aquatic feeds. The system 10 permits the processor to formulate feeds of varying density while affording a convenient means of extrusion control and diversion of unacceptable product.

Figure 1:
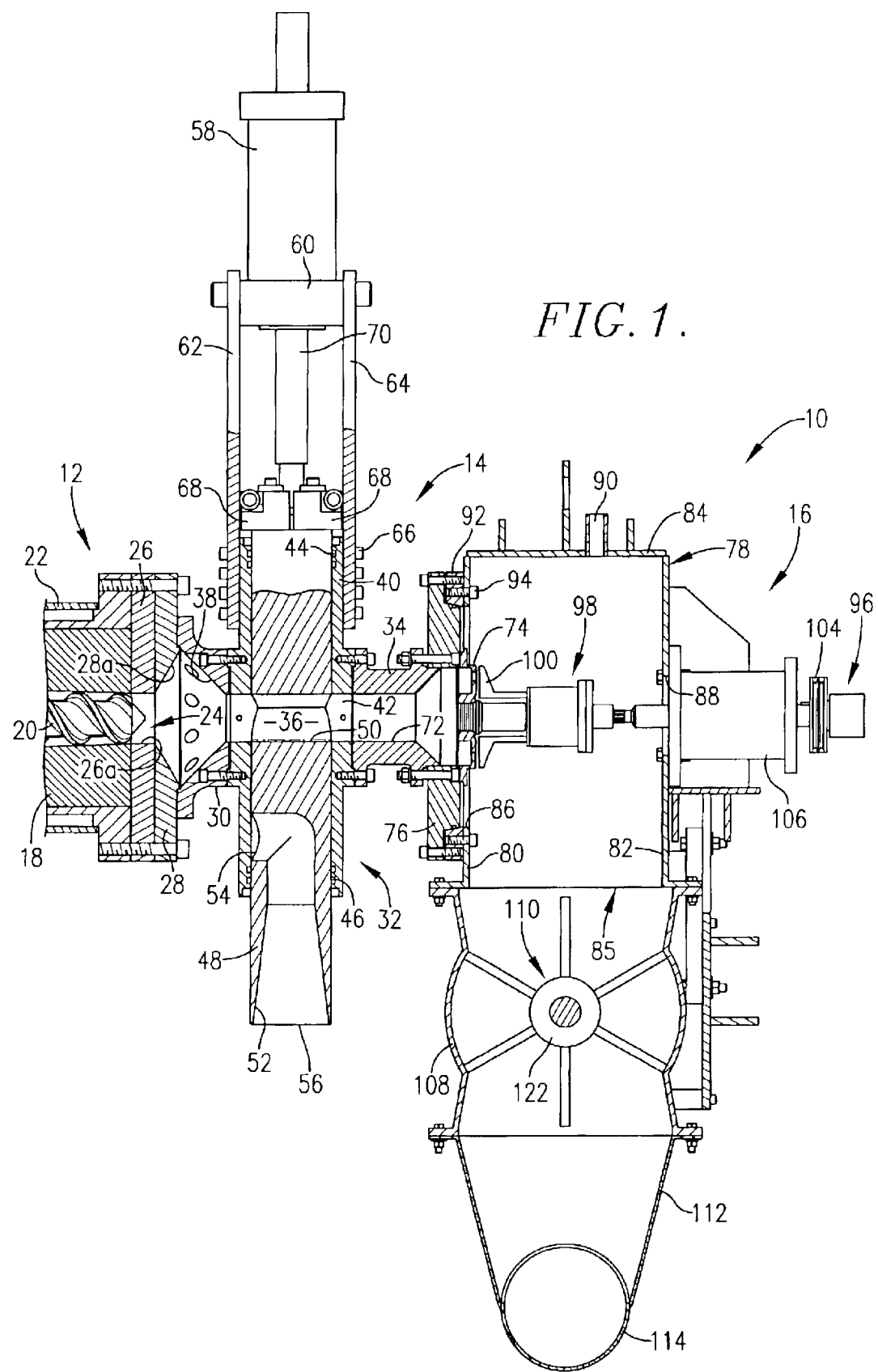
FIG. 1 is a fragmentary view in partial vertical section illustrating an extrusion system in accordance with the invention including a back pressure valve assembly and a superatmospheric pressure treatment assembly.
Figure 2:
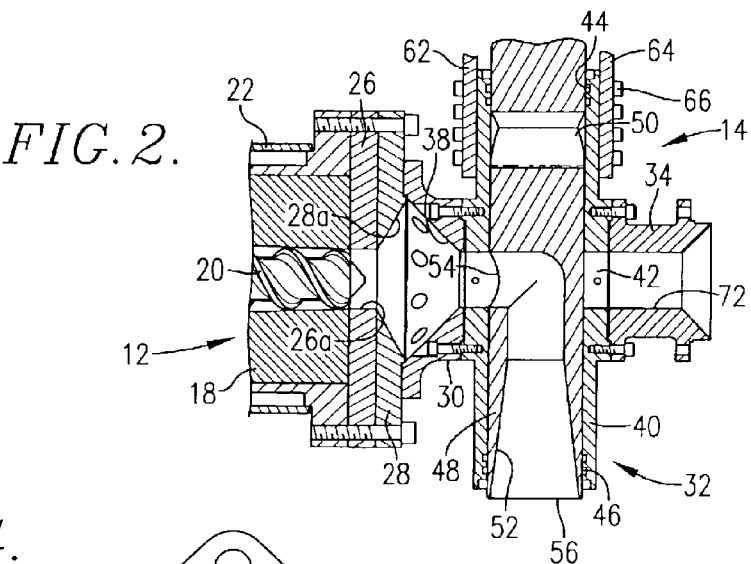
FIG. 2 is a fragmentary vertical sectional view similar to that of FIG. 1, but depicting the back pressure valve assembly in the product diversion position thereof.

In more detail, the extruder 12 includes an elongated extruder barrel 18 having one or more elongated, axially rotatable, flighted extrusion screws 20 within the barrel 18 (e.g., the extruder 12 may be of the single or twin screw variety). In typical practice, the barrel 18 is formed of a plurality of end-to-end interconnected tubular barrel sections and has an inlet (not shown) for introduction of ingredients to be processed, and the screw(s) 20 are also segmented. Additionally, use may be made of a preconditioner upstream of the extruder inlet for the purpose of initially heating, moisturizing and partially cooking of these ingredients. Wenger DDC preconditioners are particularly suited for this application. As illustrated in FIGS. 1 and 2, the barrel 18 may be provided with external jacketing 22 permitting introduction of heating or cooling media about the extruder heads for temperature control. In addition, the barrel presents an outlet 24 for passage of processed material into the remainder of system 10. The end of barrel 18 includes a pair of plates 26 and 28 which include central openings 26a, 28a communicating with outlet 24; it will be observed that opening 28a is frustoconical as shown. As will be appreciated by those skilled in the art, feed ingredients passing through extruder 12 are subjected to increasing levels of temperature, pressure and shear, and may be substantially cooked by virtue of such treatment.

The back pressure valve assembly 14 includes three interconnected components, namely transition 30, valve unit 32 and tubular barrel segment 34. These components are aligned end-to-end and cooperatively define a passageway 36 throughout the entirety of the assembly 14.

In more detail, the transition 30 is secured to plate 28 and has a converging opening 38. The valve unit includes an upright tubular segment 40 generally transverse to the longitudinal axis of passageway 36 and having a laterally extending opening 42; the upper and lower ends of the segment 40 include internal sealing rings 44, 46. An elongated valve member 48 is situated and vertically reciprocal within segment 40. The valve member 48 includes a somewhat triangularly-shaped, laterally extending through opening 50 as well as a product diversion passageway or channel 52 including an inlet opening 54 and outlet 56. The valve member 48 is selectively movable within segment 40 by means of piston and cylinder assembly 58. In particular, the assembly 58 is supported via a mounting block 60 in turn attached to laterally spaced apart, upright plates 62, 64; the latter are secured by fasteners 66 to opposite sides of the segment 40. In order to insure smooth operation of the valve member 48, a pair of roller blocks 68 are secured to the upper end of the valve member, and the piston rod 70 forming a part of assembly 58 is secured to the blocks 68. The barrel segment 34 has internal passageway 72 and is bolted to segment 40 as shown. The outer end of the segment 34 supports a restricted orifice die plate 74. Finally, a circumscribing mounting plate 76 is also secured to the outer end of segment 34, and extends about the exit of passageway 72.

Figure 4:
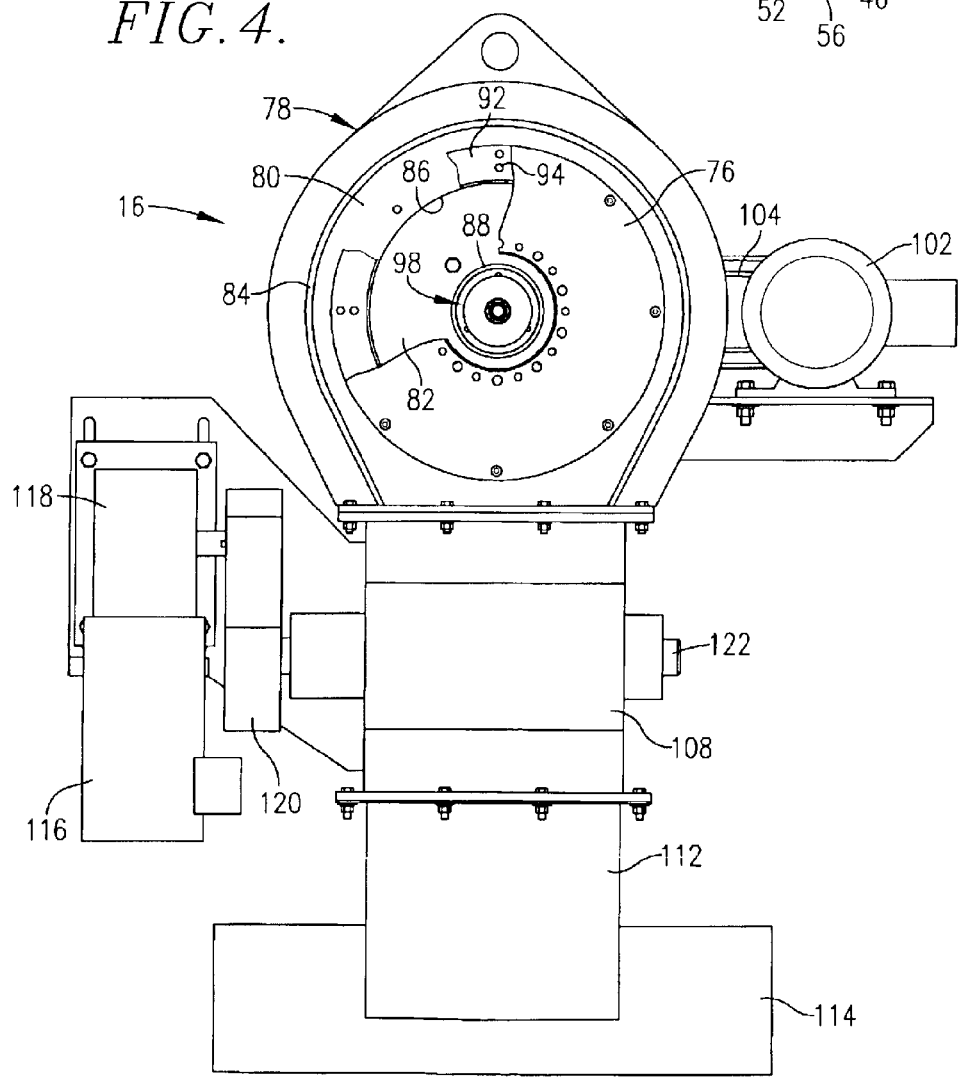
FIG. 4 is a rear view with parts broken away of the extrusion system of FIG. 1, depicting the inlet face of superatmospheric pressure treatment assembly.

The assembly 16 in the illustrated embodiment includes a housing 78 having a rear wall 80, front wall 82, sidewall 84 and lower product exit opening 85. As best seen in FIGS. 1 and 4, the rear wall 80 includes an entrance opening 86, whereas front wall 82 has a knife opening 88. The sidewall 84 is equipped with a steam inlet 90. The rear wall 80 of housing 78 is secured to plate 76 by means of an adaptor/sealing ring 92 and fasteners 94.

A knife unit 96 also forms a part of the assembly 16 and includes a cutter 98 located within housing 78 and supporting a cutting blade 100 situated adjacent the exit face of die plate 74. The cutter 98 is powered by means of external motor 102, belt drive 104 and bearing assembly 106, the latter being coaxial with cutter 98 and secured to the outer face of rear wall 82.

An outlet chamber 108 is secured to the underside of housing 78 and includes a rotatable or "star wheel" valve 110. The lower end of chamber 108 supports a delivery chute 112 and conveyor housing 114. Referring to FIG. 4, it will be seen that the valve 110 is rotated by means of motor 116, gear box 118, belt drive 120 and drive shaft 122.

The extrusion system 10 is designed to process feed ingredients by passage thereof in serial order through extruder 12, back pressure valve assembly 14 and post-extrusion treatment assembly 16. In this regard, the operation of extruder 12 is entirely conventional and thus will not be described in detail. In any case, material emerging from barrel 18 passes through openings 26a, 28a and into transition 30. At this point, the material passes through openings 42 and 50 and passageway 72 for ultimate extrusion through die 74. It will be appreciated, however, that valve member 48 may be adjusted so as to alter the effective cross-sectional area presented by the passageway 36. Such adjustment is effected through appropriate operation of piston and cylinder assembly 58, so that the valve member opening 50 may be shifted relative to the lateral opening 42. It has been found that such adjustment is an effective way of altering the pressure conditions within the system 10, which may be required or desirable in order to accommodate different products and/or processing conditions.

After passage through the assembly 14 and die plate 74, the extrudate passes directly into housing 78, without passage through the atmosphere. Of course the extrudate issuing from plate 74 is immediately cut through the rotation of knife blade 100 to yield pellets or pieces of desired length. The conditions within housing 78 are preferably superatmospheric, generally between 0.1–50 psi and more preferably from about 0.5–20 psi. Such conditions are established owing to the sealed nature of housing 78 and introduction of steam or other pressurizing gas into the housing through inlet 90. Normally, the cut product will have a residence time within housing 78 of from about 0.1–3 seconds, more preferably from about 0.5–1.5 seconds. Temperature conditions within the housing 78 are typically within the range of from about 80–140° C., more preferably from about 100–120° C. After passage through the rotary valve 110, the product descends through chute 112 and into housing 14 for conveyance of the product for downstream processing or packaging.

In other situations, it is possible to shift the valve member 48 upwardly to the product diversion position depicted in FIG. 2. In this orientation, the inlet opening 54 is moved into registry with opening 40 of segment 40 that product passing through extruder 12 and transition 30 is diverted downwardly as waste or rework product. Such a functionality is very useful during system startup or during upset conditions, so as to prevent undesirable product from passing through the post-extrusion assembly 16 for mixture with acceptable product.

FIG. 5 illustrates another embodiment in accordance with the invention in the form of an extrusion system 124 comprising extruder 12, back pressure valve system 14, and post-extrusion treatment assembly 126. The extruder 12 and valve assembly 14 are identical to the like numbered components described previously, and thus require no further discussion.

The treatment assembly 126 in this instance includes a two-part, arcuate, product-guiding cowling 128 having an entrance 130 and an exit 132. The two halves of the cowling are individually and pivotally secured to opposed portions of the barrel segment 34 adjacent die 74, using conventional hinge structure permitting the respective halves to be pivoted about individual upright axes. As illustrated in FIG. 5, the cowling includes a vent pipe 133, with the adjacent margins of the cowling halves being relieved as at 133a in order to accommodate the drive for cutter 98.

The assembly 126 also includes a sealed housing 134 disposed below cowling exit 132. The housing 134 includes a rotary valve inlet section 136, a central section 138 and a rotary valve output section 140; these sections are interconnected to define a continuous treatment chamber. Each of the sections 136, 140 are identical and include a rotary "star wheel" valve 142, 144 identical with previously described rotary valve 110. The inlet valve section 136 is equipped with a top plate 146 having an entrance opening 148. The transition section 138 has an inlet 148 as shown, permitting introduction of steam or other pressurizing gas. Finally, a chute 112 and housing 114 are secured to the bottom or outlet end of section 140, these components being identical with similarly numbered components described previously.

The operation of system 124 proceeds much in the manner of system 10, i.e., such operation is identical through extruder 12 and back pressure valve assembly 14. However, in the FIG. 5 embodiment, as the extrudate emerges from die plate 74 and is cut by rotating blade 100, the product passes through cowling 128 and into the housing 134. It will be appreciated in this respect that the interior of cowling 128 is at atmospheric pressure, owing to the fact that the cowling exit 132 is open and not directly connected to the housing 134. Generally speaking, it is preferred that the residence time within the cowling 128 before entry into housing 134 be relatively short and usually no more than about 1.5 seconds, preferably up to about 1 second. In any case, as the product passes from the cowling exit, it immediately enters housing 134 through valve 142. Thereupon, the product is processed within the housing, preferably using the conditions of pressure, temperature and residence time described above with reference to housing 78. Similarly, as the product exits the chamber 134 through valve 144, it descends through chute 112 and housing 114 for downstream processing.

We claim:

1. An extruder system comprising:
    an elongated tubular extruder barrel presenting an outlet end;
    an elongated, axially rotatable, flighted screw within said extruder barrel;
    a selectively adjustable back pressure valve assembly operatively coupled to said extruder barrel outlet end, said assembly including a structure defining a passageway with an inlet and an outlet, said inlet communicating with said extruder barrel outlet end, said assembly having a valve member selectively shiftable relative to said passageway for altering the effective cross-sectional open area presented by the passageway; and
    a product treatment assembly located adjacent said passageway outlet for receiving product after passage through said extruder barrel and back pressure valve assembly, said treatment assembly permitting superatmospheric pressure treatment of said product therein.

2. The system of claim 1, said structure including an upright tubular segment transverse to the longitudinal axis of the passageway, said valve member being shiftable within said tubular segment and having a through-opening permitting passage of said product from said extruder barrel outlet end through said valve member and out passageway outlet.

3. The system of claim 2, including a selectively actuatable piston and cylinder assembly coupled to said valve member for selective shifting thereof.

4. The system of claim 2, said valve member including a diversion channel formed therein and oriented so that, when the diversion channel is in communication with said passageway, product from said extruder barrel is diverted away from said treatment assembly.

5. The system of claim 1, said treatment assembly including a sealed housing configured such that superatmospheric pressure conditions may be maintained therein.

6. The system of claim 5, said sealed housing including a rotary outlet valve adjacent the lower end thereof permitting discharge of product from the housing while maintaining said superatmospheric pressure conditions.

7. The system of claim 5, including a steam inlet operatively coupled with said housing for introduction of steam into the housing.

8. The system of claim 1, said housing surrounding said passageway outlet so that product emerging from the passageway outlet passes directly into said sealed housing without passing through atmospheric pressure.

9. The system of claim 1, said treatment assembly comprising a product-guiding cowling open to the atmosphere and a sealed treatment housing having an inlet and an outlet, one end of said cowling disposed about said passageway outlet and the other end of the cowling located adjacent said treatment housing inlet.

10. The system of claim 8, said treatment housing having a rotary inlet valve adjacent the housing inlet and a rotary outlet valve adjacent the housing outlet, said rotary valves permitting entrance of product from said cowling into the housing, and exit of the product from the housing, while maintaining said superatmospheric pressure conditions within the housing.

11. The system of claim 9, including a steam inlet operatively coupled with said housing for introduction of steam into the housing.

12. The system of claim 9, there being an apertured die plate secured to said passageway outlet, and a knife assembly adjacent said die plate for cutting product passing through the die plate, said cowling including a pair of cowling segments each hingedly supported adjacent said barrel segment outlet and selectively openable to permit access to the knife assembly.

13. The system of claim 8, said cowling being configured such that said product passing therethrough is subjected to atmopsheric pressure conditions for a period of up to about 1.5 seconds.

14. The system of claim 12, said period being less than about 1 second.

15. An extruder system comprising:
   an elongated tubular extruder barrel presenting an outlet end;
   an elongated, axially rotatable, flighted screw within said extruder barrel;
   a product treatment assembly located for receiving product after passage thereof through said extruder barrel, said treatment assembly comprising a product-guiding cowling open to atmospheric pressure and a sealed treatment housing having an inlet and an outlet, one end of said cowling disposed about said barrel segment outlet and the other end of the cowling located adjacent said treatment housing inlet,
   said treatment housing permitting superatmospheric pressure treatment of said product therein.

16. The system of claim 15, said treatment housing having a rotary inlet valve adjacent the housing inlet and a rotary outlet valve adjacent the housing outlet, said rotary valves permitting entrance of product from said cowling into the housing, and exit of the product from the housing, while maintaining said superatmospheric pressure conditions within the housing.

17. The system of claim 16, including a steam inlet operatively coupled with said housing for introduction of steam into the housing.

18. The system of claim 16, there being a knife assembly for cutting said product, said cowling including a pair of cowling segments each hingedly supported to permit access to the knife assembly.

19. The system of claim 15, said cowling being configured such that said product passing therethrough is subjected to atmopsheric pressure conditions for a period of up to about 1.5 seconds.

20. The system of claim 19, said period being less than about 1 second.

21. A method of processing a product comprising the steps of:
   providing an extruder including an elongated extruder barrel equipped with an elongated, axially rotatable, flighted screw therein, and an apertured die plate;
   passing product ingredients into and through said extruder and die plate to form an extrudate, and, during such passage, subjecting the ingredients to heat, pressure and shear in order to at least partially cook said ingredients;
   subdividing said extrudate;
   passing said subdivided extrudate through atmospheric pressure for a maximum period of up to about 1.5 seconds;
   directing said subdivided extrudate after said atmospheric passage into and through a sealed treatment housing; and
   subjecting the subdivided extrudate to a superatmospheric pressure treatment within said housing.

22. The method of claim 21, said period being less than about 1 second.

23. The method of claim 21, said passing strep comprising the step of directing the subdivided extrudate into and through a cowling open to the atmosphere.

24. The method of claim 21, further including step of directing steam into said housing in order to establish said superatmospheric pressure conditions therein.

25. The method of claim 21, said subdividing step comprising the step of cutting said extrudate as the extrudate passes through said die plate.

* * * * *